Patented Oct. 2, 1934

1,975,258

UNITED STATES PATENT OFFICE 1,975,258

DYESTUFFS OF THE PYRANTHRONE SERIES AND PROCESS OF MAKING THE SAME

Joseph Deinet, Milwaukee, Wis., assignor to E. I. du Pont de Nemours & Company, Wilmington, Del., a corporation of Delaware No Drawing. Application October 15, 1932, Serial No. 637,987

20 Claims. (Cl. 260—61)

This invention relates to novel dyestuffs of the pyranthrone series and to a process of making the same. More particularly it deals with dyestuffs of the anthraquinonyl-amino-pyranthrone series.

It is an object of this invention to produce novel vat-dyestuffs of the anthraquinonyl-amino-pyranthrone series, which are distinguished from known dyestuffs of the same series by different physical properties, and, very probably, different chemical structure.

It is a further object of this invention to produce novel vat dyestuffs of the anthraquinonyl-amino-pyranthrone series which possess remarkable fastness qualities.

It is a further object of this invention to produce novel vat dyestuffs ranging in shade of their dyeings upon cotton from grey to olive green, khaki and brown, and including within this range novel shades of olive green and khaki, heretofore not known in conjunction with dyestuffs of the anthraquinonyl-amino-pyranthrone series.

Other and further important objects of this invention will appear as the description proceeds.

By "pyranthrone" in this specification I am referring to the well known condensation product obtainable by heating in alkaline solution 2,2'-dimethyl-1, 1-dianthraquinonyl. This compound is itself a vat dyestuff, and is generally assumed to possess a structure as represented by the following formula:

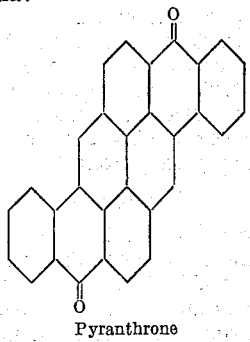

Pyranthrone

It has been known that this compound may be halogenated to produce various derivatives containing from 1 to 4 or even 8 atoms of halogen per molecule. It has also been known to react these various halogen derivatives with amino-anthraquinone bodies to produce various mono- or poly-anthraquinonyl-amino-pyranthrone compounds. The halogenation has heretofore been carried out in various media, such as nitrobenzene, sulfuric acid, oleum, chlorosulfonic acid, or even simply aqueous suspension. When these halogen compounds are condensed with alpha-amino-anthraquinone, vat dyestuffs are obtained which dye cotton in shades ranging from brown to violet-black.

I have now found that if pyranthrone is reacted upon with halogenating agents in the presence of certain catalyzers, as more fully set forth below, novel halogen addition-compounds of pyranthrone are produced which may then be treated with oxidizing or different halogenating agents as more particularly defined hereinafter to produce novel mono-, di-, or tri-halogen derivatives of pyranthrone. These novel halogen derivatives are apparently isomeric with hitherto known halogen-pyranthrone derivatives. In dry form they are of bright orange to red colors, as distinguished from the much darker, generally orange colors of other halogen-pyranthrones. Their most important distinguishing characteristic, however, resides in their property of yielding upon condensation with alpha-amino-anthraquinone, vat dyestuffs which dye cotton in khaki to green shades. The condensation products obtained from mono-halogen-pyranthrone obtainable according to this invention and alpha-amino-anthraquinone give khaki dyeings. That from the dihalogen or trihalogen pyranthrone gives olive-green dyeings. These novel vat dyestuffs possess exceedingly valuable fastness properties and tinctorial strength, and excel over other olive-green vat dyestuffs now on the market.

With other alpha-amino-anthraquinone compounds other shades may be obtained which overlap in part with the spectrum of colors obtainable from known halogen pyranthrones. The shades, however, produced by the use of alpha-amino-anthraquinone distinguish clearly from known dyestuffs of this series by their olive-green or khaki shades, as pointed out above. For this reason I am using herein the dyestuff produced by the use of alpha-amino-anthraquinone as a standard of comparison between my novel series of halogen pyranthrones and the corresponding known compounds of the art.

It may be added that even where a particular alpha-amino-anthraquinone compound gives with my novel halogen-pyranthrone substantially the same shade as obtainable by the use of known halogen-pyranthrones, the fastness qualities of my novel dyestuffs are far superior to those of the corresponding old dyestuffs. This circumstance points further to the fact that my novel dyestuffs belong to a new and chemically different series than the known anthraquinonyl-amino-pyranthrone dyestuffs of the art.

The particular manner of halogenation is more fully described in copending application Ser. No. 637,985, filed of even date herewith. It consists essentially of halogenating pyranthrone under such conditions as to produce first a pyranthrone-halogen addition compound. This may be effected by reacting upon pyranthrone, suspended in an anhydrous organic liquid, with a halogenating agent such as hydrobromic acid, bromine or sulfuryl chloride, in the presence of a mild reducing agent or an organic compound which is readily susceptible to halogenation. Aniline or its salts function exceptionally well for this purpose, but in said copending application as well as in copending application Ser. No. 637,986, a number of additional so-called "directing catalysts" are set forth.

In the next step of said particular process, the said pyranthrone-halogen addition-product is subjected to the action of an anhydrous oxidizing or halogenating agent, such as thionyl chloride, sulfuryl chloride, chlorine, or bromine, but different from and more powerful than the halogenating agent used in the first step. This decomposes the addition-product, producing a halogenated pyranthrone, apparently isomeric with hitherto known halogen-pyranthrones, but not identical therewith. Depending on the particular pair of halogenating agents selected for the two steps above mentioned, the resultant product may contain 1, 2 or 3 atoms of halogen. For instance, the selection of bromine for the first step and thionyl chloride for the second step results substantially in a monobromo-pyranthrone. The selection of bromine and chlorine or of bromine and sulfuryl chloride for the two respective steps, gives what appears to be a mixture of dibromo-pyranthrone with monobromo-monochloro-pyranthrone, while the successive use of sulfuryl chloride and chlorine results in substantially a trichloro-pyranthrone. All these products are distinguished over the respective known halogen-pyranthrones by being more bright and more red in color when in dry form.

I have now found that when these bodies are condensed with amino-anthraquinones, particularly alpha-amino-anthraquinones, new and valuable vat dyestuffs are produced which appear to be different from known vat dyestuffs of the anthraquinonyl-amino-pyranthrone series. This difference expresses itself by generally different shades, some entirely out of the range of colors hitherto known in connection with dyestuffs of this general class, and by generally superior tinctorial strength, brightness and fastness qualities. In general, the dyestuffs of my novel series possess qualities which make them extremely valuable in technical application.

The shades obtainable with my novel halogen-pyranthrones depend first of all on the particular amino-anthraquinone compound selected, and secondly on whether the monohalogen or di- or tri-halogen-pyranthrone is used. Generally speaking, those dyestuffs which contain at least two molecules of an amino-anthraquinone body attached to one molecule of pyranthrone, give on cotton olive-green to grey shades; while those which contain only one or one-half of a molecule of an amino-anthraquinone attached to each pyranthrone residue give khaki to brown shades. However, the great choice of amino-anthraquinone compounds available and the great variety of combinations possible with my novel series of halogen-pyranthrones, multiplied by the various options of using different molecular ratios of the anthraquinone body to the pyranthrone body, make a precise generalization practically impossible. The specific examples below illustrate these points more clearly. It will be noted that the shade may be varied not only by selecting different initial materials, but by varying the molecular ratio of the same pair of initial materials.

The condensation between the halogen-pyranthrone and the amino-anthraquinone body may be carried out in the general manner used for reactions of this type. Alkaline condensing agents and copper or copper compounds facilitate the reaction. Alkali-metal carbonates appear to be particularly valuable as condensing or acid-absorbing agents. Copper bronze or copper powder gives good results as catalyst.

As suspending medium for the reaction, any suitable organic liquid or melt may be used. In view, however, of the high temperature of the reaction, high boiling liquids or melts are to be preferred. This avoids the necessity of working under pressure. But it is to be understood that lower boiling liquids together with pressure may be employed, if desired.

Without limiting my invention to any particular procedure, the following examples, in which parts by weight are given will serve more fully to illustrate the same.

*Example 1*

20 parts of dibrom-pyranthrone obtained according to Example 1 of copending application Ser. No. 637,985 are heated together with 17 parts alpha-amino-anthraquinone in 400 parts of naphthalene in the presence of 38 parts soda ash and one part copper powder at about 215° C. for 12 hours. The mass is cooled to 140° C., diluted with 250–300 parts solvent naphtha and filtered. The filter cake is washed successively with hot solvent naphtha, alcohol and water, and dried. It dyes cotton from a violet hydrosulfite vat in very strong and fast olive-green shades. Its solution color in sulfuric acid is blue. It is most probably a di-alpha-dianthraquinonyl-diamino-pyranthrone.

*Example 2*

75 parts of the monobrom-pyranthrone obtained according to Example 4 of copending application Ser. No. 637,985, 67 parts alpha-amino-anthraquinone, 1400 parts naphthalene, 140 parts soda ash, and 3 parts copper bronze are heated at the boiling temperature of the mixture for 12 hours. The mass is cooled and worked up as in Example 1.

The new condensation product dyes cotton from a violet hydrosulfite vat in khaki shades of great tinctorial strength, and fastness. It dissolves in sulfuric acid with a reddish-blue color. It is most probably a mono-alpha-anthraquinonyl-amino-pyranthrone.

*Example 3*

20 parts dibrom-pyranthrone obtained according to Example 1 of copending application Ser. No. 637,985, and 26 parts monobenzoyl-1,4-diamino-anthraquinone are suspended in 400 parts naphthalene (molten). 40 parts soda ash and 1 part copper bronze are added and the mass treated to 215–220° for 12 hours. The mass is cooled to 140°, diluted with solvent naphtha and worked up as in Example 1.

The dyestuff obtained dyes cotton in dark green shades from a violet hydrosulfite vat.

*Example 4*

20 parts dibrom-pyranthrone obtained according to Example 1 of copending application Ser. No. 637,985 are suspended together with 26 parts monobenzoyl-1,5-diamino-anthraquinone in 450 parts of molten naphthalene and heated after addition of 40 parts soda ash and 1 part copper bronze to 215° for 12 hours. The mass is worked up as in the previous example. The dyestuff dyes cotton from the vat an olive-green shade and dissolves with blue color in sulfuric acid.

Example 5

20 parts dibrom-pyranthrone as used in the above examples are heated with 19 parts 1-amino-2-methyl-anthraquinone, 38 parts soda ash and 1 part copper powder in 400 parts naphthalene to 215° for 12 hours. After working up the melt, the dyestuff is obtained in dark needles which dye cotton from a violet hydrosulfite vat in dark green shades.

Example 6

400 parts of naphthalene, 46 parts of soda ash, 1 part of copper powder, 27 parts of alpha-amino-anthraquinone and 20 parts of the chlor-pyranthrone obtained in Example 6 of copending application Ser. No. 637,985 are heated together for 12 hours at 210-215° C. The mass is cooled to 120° C.; 800 parts of solvent naphtha are added; the mass is filtered at 60° C., washed successively with solvent naphtha, alcohol and boiling water, and dried. The product dyes cotton from the hydrosulfite vat in olive-green shades. In substance it is a black powder, which dissolves in concentrated sulfuric acid with a red-blue color.

Example 7

20 parts of dibrom-pyranthrone obtained according to Example 1 of copending application Ser. No. 637,985 are heated together with 18 parts of 1,5-diamino-anthraquinone in 400 parts of naphthalene in the presence of 38 parts of soda ash and one part of copper powder at about 215° C. for 12 hours. The mass is cooled and worked up as in Example 1.

The dyestuff thus obtained dyes cotton from a violet hydrosulfite vat in grey shades. It dissolves in sulfuric acid with a reddish-blue color.

Example 8

20 parts of dibrom-pyranthrone obtained according to Example 1 of copending application Ser. No. 637,985 are heated together with 18 parts of 1,4-diamino-anthraquinone in 400 parts of naphthalene in the presence of 38 parts of soda ash and one part of copper powder at about 215° C. for 12 hours. The mass is cooled and worked up as in Example 1.

The dyestuff dyes cotton from a violet vat an olive-green shade.

Example 9

20 parts of dibrom-pyranthrone obtained as in the previous examples are heated together with 4.2 parts of 1,4-diamino-anthraquinone in 300 parts of naphthalene, in the presence of 20 parts of soda ash and ½ part of copper powder at about 215° C. for 12 hours. The mass is cooled and worked up as in Example 1.

The dyestuff dyes cotton in bright brown shades.

Example 10

20 parts of dibrom-pyranthrone obtained as above, are heated together with 34 parts of 4,4'-diamino-1,1'-dianthrimide in 500 parts of naphthalene in the presence of 20 parts of soda ash and 1 part of copper powder at about 215° C. for 12 hours. The mass is cooled and worked up as in Example 1.

The dyestuff dyes cotton from a dull violet vat in grey shades. It dissolves in concentrated sulfuric acid with a blue color.

Example 11

20 parts of dibrom-pyranthrone are heated together with 8.1 parts of 4,4'-diamino-1,1'-dianthrimide in 300 parts of naphthalene in the presence of 20 parts of soda ash and 1 part of copper powder at about 215° C. for 12 hours. The mass is cooled and worked up as in Example 1.

The dyestuff dyes cotton from a dull red-violet vat in brown shades.

Example 12

20 parts of dibrom-pyranthrone obtained according to Example 1 of copending application Ser. No. 637,985 are heated together with 30 parts of alpha-amino-anthraquinone-dichlor-acridone, of the probable formula:

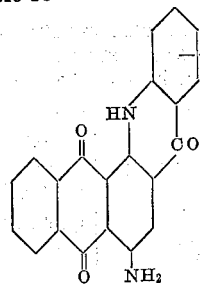

in 500 parts of naphthalene in the presence of 20 parts of soda ash and one part of copper powder at about 215° C. for 12 hours. The mass is cooled and worked up as in Example 1.

The dyestuff obtained dyes cotton from a violet hydrosulfite vat in strong olive-green shades.

The results of the above examples are summarized in the annexed table, which shows the starting materials, the molal ratios used and the shades of the dyeings upon cotton by the dyestuffs obtained. In this table the symbol AQ is used to represent an anthraquinone residue, monovalent, divalent or trivalent, as the case may be, depending on the number of substituents indicated. Similarly, the symbol Py is used to represent the pyranthrone residue.

In this table is also given the probable structure of the resulting dyestuff. The bearing of structure upon shade is readily apparent from this table. It seems that all the dyestuffs having the nuclear arrangement AQ—NH—Py—NH—AQ (and obtainable according to this invention) dye cotton olive-green to grey shades. Those, however, in which the Py nucleous is not surrounded by at least two AQ residues, give khaki to brown dyeings.

It is to be understood, however, that this theory is only hypothetical and that my invention is not dependent upon or limited by the strict correctness of this theory.

It will be understood that many variations and modifications are possible in my preferred mode of procedure without departing from the spirit of this invention.

Thus, while I have indicated in the annexed table definite proportions of the reaction materials, the same need not be adhered to strictly. This is particularly true in the case of those dyestuffs where sufficient anthraquinonyl-amino body is used to react with all the halogen of the pyranthrone body. In these cases any excess of amino-anthraquinone body may be used, without effecting the reaction or the shade of the dyestuff. The excess simply stays in solution in the naphthalene, or whatever other solvent is used, and is filtered off therewith in the filtration step. Indeed it is advantageous to work with an excess, to prevent any unreacted halogen-pyranthrone body from remaining over.

The above point is illustrated in Example 2, where 2 moles of amino-anthraquinone have been used, instead of the theoretically requisite one. It is also illustrated in Examples 1, 3, 4, 5, 7, 8, 10 and 12, where 5 to 10% excesses of the amino-anthraquinone have been used.

In cases, however, like Examples 9 and 11, where it is not desired to replace all the halogen of the pyranthrone by amino-anthraquinone bodies, it becomes necessary to work with limited proportions, as otherwise some of the fully amidated, olive-green dyestuff may be formed, and the shade may shift from brown toward olive-green.

Other alpha-amino-anthraquinone compounds may be used with great success. In particular, the halogen derivatives of the amino-anthraquinone compounds mentioned may be used to advantage.

Similarly, other acid absorbing media than soda ash and other copper catalysts than copper powder may be employed. So also the temperature of the condensation mass may be varied within wide limits, as will be readily understood to those skilled in the art.

In general, it should be understood that my procedure is susceptible to the same variations and modifications as have been employed in analogous condensations between known halogen-pyranthrones and alpha-amino-anthraquinone compounds in the art. My invention must therefore be considered as not limited in scope, except as defined by the following claims.

In the claims below it should be understood, that where I am speaking of "a pyranthrone halogen complex addition compound" I am referring to such addition compounds which may be formed from pyranthrone and the respective halogenating agent, and which are characterized by the following properties: they appear as black powders in nitrobenzene suspension; show dark-violet needles of green fluorescence when viewed under the microscope; decompose upon heating or when exposed to air or moisture to give non-halogenated pyranthrone; and when reacted upon with strong halogenating or anhydrous oxidizing agents, such as chlorine, they are converted into halogenated pyranthrones of orange to red color when in powder form.

| Ex. | AQ | Py | Color | Probable structure of dyestuffs |
|---|---|---|---|---|
| 1. | 2 mol AQ—NH$_2$ | 1 mol PyBr$_2$ | Olive. | AQ—NH—Py—NH—AQ. |
| 2. | 2 mol AQ—NH$_2$ | 1 mol PyBr | Khaki. | Py—NH—AQ. |
| 3. | 2 mol 1,4—AQ(NH$_2$)(NH—COR) | 1 mol PyBr$_2$ | Dark green. | 1,4—RCO—NH—AQ—NH—Py—NH—AQ—NH—COR. |
| 4. | 2 mol 1,5—AQ(NH$_2$)(NH—COR) | 1 mol PyBr$_2$ | Olive | 1,5—RCO—NH—AQ—NH—Py—NH—AQ—NH—COR. |
| 5. | 2 mol 1,2—AQ(NH$_2$)(CH$_3$) | 1 mol PyBr$_2$ | Dark green. | CH$_3$—AQ—NH—Py—NH—AQ—CH$_3$. |
| 6. | 3 mol AQ—NH$_2$ | 1 mol PyCl$_3$ | Olive. | AQ—NH—Py—NH—AQ<br>　　　　＼NH—AQ. |
| 7. | 2 mol 1,5—AQ(NH$_2$)(NH$_2$) | 1 mol PyBr$_2$ | Grey. | 1,5—H$_2$N—AQ—NH—Py—NH—AQ—NH$_2$. |
| 8. | 2 mol 1,4—AQ(NH$_2$)(NH$_2$) | 1 mol PyBr$_2$ | Olive. | 1,4—H$_2$N—AQ—NH—Py—NH—AQ—NH$_2$. |
| 9. | 1 mol 1,4—AQ(NH$_2$)(NH$_2$) | 2 mol PyBr$_2$ | Brown. | Br—Py—NH—AQ—NH—Py—Br. |
| 10. | 2 mol AQ—NH—AQ (NH$_2$, NH$_2$) | 1 mol PyBr$_2$ | Grey. | H$_2$N—AQ—NH—AQ—NH—Py—NH—AQ—NH—AQ—NH$_2$. |
| 11. | 1 mol AQ—NH—AQ (NH$_2$, NH$_2$) | 2 mol PyBr$_2$ | Brown. | BrPy—NH—AQ—NH—AQ—NH—Py—Br. |
| 12. | 2 mol AQ(NH—/CO—phthaloyl-Cl$_2$)(NH$_2$) | 1 mol PyBr$_2$ | Olive. | Cl$_2$-phthaloyl(NH—/CO—)—AQ—NH—Py—NH—AQ(NH—/CO—)phthaloyl-Cl$_2$ |

I claim:

1. Vat dyestuffs of the anthraquinonyl-amino-pyranthrone series dyeing cotton in brown to khaki, olive-green and grey shades, said dyestuffs being obtainable by condensing an alpha-amino-anthraquinone compound with a halogen-pyranthrone of the series obtainable by halogenating pyranthrone by a two step process involving first the formation of an intermediate pyranthrone-halogen complex addition-compound, and then decomposing said complex addition-compound in the presence of halogenating agents which act as oxidizing agents.

2. Vat dyestuffs of the following general structure:

Py—NH—AQ, wherein AQ stands for the radical of an anthraquinone compound, while Py stands for the radical of a halogenated pyranthrone of the series obtainable by reacting with a halogenating agent upon pyranthrone in nitrobenzene under mildly reducing conditions whereby to form an intermediate pyranthrone-halogen complex addition-compound and then decomposing said complex addition-compound in the presence of halogenating agents which act as oxidizing agents.

3. Vat dyestuffs of the following general formula:

AQ—NH—Py—NH—AQ, wherein AQ stands for the radical of an anthraquinone compound, while Py stands for the radical of a dihalogenated pyranthrone of the series obtainable by reacting with a halogenating agent upon pyranthrone in nitrobenzene under mildly reducing conditions whereby to form an intermediate pyranthrone-halogen complex addition-compound and then decomposing said complex addition-compound in the presence of halogenating agents which act as oxidizing agents, said dyestuff dyeing cotton in olive-green to grey shades.

4. Vat dyestuffs of the following general formula:

AQ—NH—Py—NH—AQ
            \
             NH—AQ wherein AQ stands for the radical of an anthraquinone compound, while Py stands for the radical of a trihalogenated pyranthrone of the series obtainable by reacting with a halogenating agent upon pyranthrone in nitrobenzene under mildly reducing conditions whereby to form an intermediate pyranthrone-halogen complex addition-compound and then decomposing said complex addition-compound in the presence of halogenating agents which act as oxidizing agents, said dyestuff dyeing cotton in olive-green to grey shades.

5. Vat dyestuffs of the anthraquinonyl-aminopyranthrone series dyeing cotton in greenish shades.

6. Vat dyestuffs of the anthraquinonyl-aminopyranthrone series dyeing cotton in khaki to olive-green to dark green shades.

7. A compound of the general formula:

Py—[NH—AQ]$_n$, wherein $n$ stands for 1 or 2, AQ stands for the monovalent radical of an anthraquinone compound, and Py stands for the monovalent or divalent radical of pyranthrone, obtainable by eliminating halogen from a mono- or dihalogen-pyranthrone, in turn obtainable by halogenating pyranthrone by a two-step process involving first the formation of an intermediate pyranthrone-halogen addition-product, and then decomposing said addition-product by the aid of halogenating agents which act as oxidizing agents.

8. The process of producing vat dyestuffs which comprises reacting an amino-anthraquinone compound with a halogen-pyranthrone body which is characterized by giving with alpha-amino-anthraquinone a dyestuff dyeing cotton in khaki to olive-green shades.

9. The process of producing vat dyestuffs which comprises reacting in the presence of an acid absorbing agent and a copper catalyst an alpha-amino-anthraquinone compound with a halogen-pyranthrone body which is characterized by giving with alpha-amino-anthraquinone a dyestuff dyeing cotton in khaki to olive-green shades.

10. The process of producing vat dyestuffs which comprises reacting in the presence of an alkali-metal carbonate and copper an alpha-amino-anthraquinone compound and a halogen-pyranthrone body characterized by yielding upon condensation with alpha-amino-anthraquinone a product of dyeing cotton in khaki to olive-green shades.

11. The process of producing a vat dyestuff which comprises condensing in the presence of an alkaline carbonate and a copper catalyst an alpha-amino-anthraquinone compound and a halogenated pyranthrone of the series obtainable by halogenating pyranthrone by a two-step process involving first the formation of an intermediate addition-product and then decomposing the addition-product by the aid of anhydrous halogenating agents.

12. The process of producing a vat dyestuff which comprises condensing in the presence of an alkaline carbonate and a copper catalyst an alpha-amino-anthraquinone compound and a chlorinated pyranthrone obtainable by reacting with sulfuryl chloride upon pyranthrone in nitrobenzene under mildly reducing conditions whereby to form an intermediate addition-product and decomposing the addition-product by the aid of chlorine.

13. The process of producing a vat dyestuff which comprises condensing in the presence of an alkaline carbonate and a copper catalyst an alpha-amino-anthraquinone compound and a dihalogen-pyranthrone obtainable by reacting with bromine upon pyranthrone in nitrobenzene under mildly reducing conditions whereby to form an intermediate addition-product and decomposing the addition-product by the aid of an anhydrous chlorinating agent selected from the group consisting of sulfuryl chloride and chlorine.

14. The process of producing a vat dyestuff which comprises condensing in the presence of an alkaline carbonate and a copper catalyst an alpha-amino-anthraquinone compound and a monohalogen-pyranthrone of the series obtainable by reacting upon pyranthrone with bromine in nitrobenzene under mildly reducing conditions whereby to form an intermediate addition-product and then decomposing the addition-product by the aid of thionyl chloride.

15. The process of producing vat dyestuffs which comprises converting pyranthrone into an intermediate pyranthrone-halogen addition-compound, decomposing said addition-compound by the aid of halogenating agents which act as oxidizing agents to produce halogen-pyranthrone bodies, and reacting said halogen-pyranthrone bodies with an amino-anthraquinone compound.

16. The process of producing a vat dyestuff which comprises reacting upon pyranthrone with a halogenating agent in a dry, inert organic medium and in the presence of a readily halogenable organic compound, whereby to form an intermediate pyranthrone-halogen addition-compound, decomposing said addition-compound by the aid of an anhydrous halogenating agent selected from the group consisting of thionyl chloride, sulfuryl chloride, chlorine and bromine, but different from the halogenating agent used in the first step, to produce a halogen-pyranthrone body, and reacting said halogen-pyranthrone body with an alpha-amino-anthraquinone compound in the presence of an alkaline condensing agent.

17. The process of producing a vat dyestuff which comprises reacting upon pyranthrone with a halogenating agent in a dry, inert organic medium and in the presence of a readily halogenable organic compound, whereby to form an intermediate pyranthrone-halogen addition-compound, decomposing said addition-compound by the aid of an anhydrous halogenating agent selected from the group consisting of thionyl chloride, sulfuryl chloride, chlorine and bromine, but different from the halogenating agent used in the first step, to produce a halogen-pyranthrone body, and reacting said halogen-pyranthrone body with an alpha-amino-anthraquinone compound in the presence of an alkali-metal carbonate and a copper catalyst.

18. Vat dyestuffs of the general formula Py-NH-AQ, wherein AQ stands for the radical of an anthraquinone compound, while Py stands for the radical of a halogenated pyranthrone of the series obtainable by decomposing a pyranthrone-halogen complex addition-compound in the presence of an anhydrous halogenating agent selected from the group consisting of thionyl chloride, sulfuryl chloride, chlorine and bromine.

19. Vat dyestuffs of the anthraquinonyl-amino-pyranthrone series, dyeing cotton in brown to khaki, olive-green and grey shades, said dyestuffs being obtainable by condensing an alpha-amino-anthraquinone compound selected from the group consisting of: alpha-amino-anthraquinone, alpha-amino-beta-methyl-anthraquinone, alpha, alpha'-diamino-anthraquinone, alpha-amino-alpha-benzoylamino-anthraquinone, alpha-amino-anthraquinone-acridones, and alpha, alpha'-diamino-dianthraquinonyl-amines, halogen derivatives of these, and other anthraquinone derivatives containing a primary amino group in an alpha position, with a halogenated pyranthrone of the series obtainable by decomposing a pyranthrone-halogen complex addition-compound in the presence of an anhydrous halogenating agent selected from the group consisting of thionyl chloride, sulfuryl chloride, chlorine and bromine.

20. Vat dyestuffs of the di-(anthraquinonyl-amino)-pyranthrone series, dyeing cotton in olive-green to grey shades, said dyestuffs being obtainable by condensing 2 mols of an alpha-amino-anthraquinone compound selected from the group consisting of: alpha-amino-anthraquinone, alpha-amino-beta-methyl-anthraquinone, alpha, alpha'-diamino-anthraquinone, alpha-amino-alpha-benzoylamino-anthraquinones, alpha-amino-anthraquinone-acridones, and alpha, alpha'-diamino-dianthraquinonyl-amines, halogen derivatives of these, and other anthraquinone derivatives containing a primary amino group in an alpha position, with a dihalogen-pyranthrone of the series obtainable by decomposing a pyranthrone-bromine complex addition compound in the presence of a halogenating agent selected from the group consisting of chlorine and sulfuryl chloride.

JOSEPH DEINET.

CERTIFICATE OF CORRECTION.

Patent No. 1,975,258.　　　　　　　　　　　　　　　October 2, 1934.

JOSEPH DEINET.

It is hereby certified that error appears in the printed specification of the above numbered patent requiring correction as follows: Page 6, lines 80 and 100, claims 19 and 20 respectively, strike out the word "and"; and that the said Letters Patent should be read with these corrections therein that the same may conform to the record of the case in the Patent Office.

Signed and sealed this 13th day of November, A. D. 1934.

Leslie Frazer (Seal)　　　　　　　　　　　　　　　　　　Acting Commissioner of Patents.